(12) United States Patent
Choi

(10) Patent No.: US 11,362,380 B2
(45) Date of Patent: Jun. 14, 2022

(54) ELECTRIC VEHICLE BATTERY PACK COOLING SYSTEM AND ELECTRIC VEHICLE BATTERY PACK SYSTEM COOLING METHOD USING SAME

(71) Applicant: LG Chem, Ltd., Seoul (KR)

(72) Inventor: Yun-Ki Choi, Daejeon (KR)

(73) Assignee: LG Energy Solution, Ltd.

( * ) Notice: Subject to any disclaimer, the term of this patent is extended or adjusted under 35 U.S.C. 154(b) by 92 days.

(21) Appl. No.: 16/765,744

(22) PCT Filed: Jun. 11, 2019

(86) PCT No.: PCT/KR2019/007008
§ 371 (c)(1),
(2) Date: May 20, 2020

(87) PCT Pub. No.: WO2020/013455
PCT Pub. Date: Jan. 16, 2020

(65) Prior Publication Data
US 2020/0295418 A1 Sep. 17, 2020

(30) Foreign Application Priority Data
Jul. 10, 2018 (KR) .......................... 10-2018-0080099

(51) Int. Cl.
*H01M 10/6568* (2014.01)
*H01M 10/613* (2014.01)
(Continued)

(52) U.S. Cl.
CPC ....... *H01M 10/6568* (2015.04); *H01M 10/44* (2013.01); *H01M 10/613* (2015.04);
(Continued)

(58) Field of Classification Search
CPC ......... B60L 2240/545; B60L 2240/549; B60L 50/64; B60L 53/62; B60L 58/26;
(Continued)

(56) References Cited

U.S. PATENT DOCUMENTS 8,994,339 B1 3/2015 Kam
2012/0009457 A1 1/2012 Lee et al.
(Continued)

FOREIGN PATENT DOCUMENTS

JP H9102331 A 4/1997
JP 2006092894 A 4/2006
(Continued)

OTHER PUBLICATIONS

International Search Report for Application No. PCT/KR2019/007008, dated Sep. 19, 2019, pp. 1-2.
(Continued)

*Primary Examiner* — Victoria H Lynch
(74) *Attorney, Agent, or Firm* — Lerner, David, Littenberg, Krumholz & Mentlik, LLP

(57) ABSTRACT

A battery pack cooling system for an electric vehicle, which may be utilized during quick charging, includes a battery pack; a water-cooling device; a thermoelectric module installed at an coolant conduit of the water-cooling device; a current sensor configured to detect a magnitude of a charging current supplied to the battery pack; and a control unit configured to determine a charging C-rate based on the magnitude of the charging current and configured to operate the thermoelectric module when the charging C-rate is at a preset threshold or above. A method of cooling such a battery pack system for an electric vehicle is also provided.

11 Claims, 6 Drawing Sheets

(51) Int. Cl.
*H01M 10/625* (2014.01)
*H01M 10/63* (2014.01)
*H01M 10/44* (2006.01)

(52) U.S. Cl.
CPC ......... *H01M 10/625* (2015.04); *H01M 10/63* (2015.04); *H01M 2220/20* (2013.01)

(58) Field of Classification Search
CPC .... H01M 10/44; H01M 10/48; H01M 10/613; H01M 10/625; H01M 10/63; H01M 10/6568; H01M 10/6572; H01M 2220/20; Y02E 60/10; Y02T 10/70; Y02T 10/7072; Y02T 90/12
See application file for complete search history.

(56) References Cited

U.S. PATENT DOCUMENTS

| | | | |
|---|---|---|---|
| 2013/0040175 | A1 | 2/2013 | Yang et al. |
| 2016/0052421 | A1 | 2/2016 | Galamb |
| 2017/0098875 | A1 | 4/2017 | Kim |
| 2017/0194681 | A1 | 7/2017 | Kim et al. |

FOREIGN PATENT DOCUMENTS

| | | |
|---|---|---|
| JP | 200844476 A | 2/2008 |
| JP | 2010282878 A | 12/2010 |
| JP | 2012226927 A | 11/2012 |
| KR | 20080053550 A | 6/2008 |
| KR | 101112442 B1 | 2/2012 |
| KR | 101205181 B1 | 11/2012 |
| KR | 101522185 B1 | 5/2015 |
| KR | 20150131759 A | 11/2015 |
| KR | 20170040619 A | 4/2017 |
| KR | 20170056201 A | 5/2017 |
| KR | 101833526 B1 | 2/2018 |
| WO | 2011138156 A1 | 11/2011 |

OTHER PUBLICATIONS

Extended European Search Report including Written Opinion for Application No. 19833053.2 dated Mar. 15, 2021, 8 pages.

ELECTRIC VEHICLE BATTERY PACK COOLING SYSTEM AND ELECTRIC VEHICLE BATTERY PACK SYSTEM COOLING METHOD USING SAME

CROSS-REFERENCE TO RELATED APPLICATIONS

The present application is a national phase entry under 35 U.S.C. § 371 of International Application No. PCT/KR2019/007008 filed on Jun. 11, 2019, which claims priority to Korean Patent Application No. 10-2018-0080099 filed on Jul. 10, 2018, the disclosures of which are incorporated herein by reference.

TECHNICAL FIELD

The present disclosure relates to a battery pack cooling system for an electric vehicle and a cooling method using the battery pack cooling system, and more particularly, to a battery pack cooling system for an electric vehicle, which may prevent a battery temperature from rising during quick charging, and a method of cooling a battery pack system for an electric vehicle by using the battery pack cooling system.

BACKGROUND ART

Recently, as the demand for portable electronic products such as notebooks and mobile phones has increased rapidly and the demand for electric carts, electric wheelchairs and electric bicycles has increased, high-performance secondary batteries capable of repeating charging and discharging are being actively studied. Also, recently, as carbon energy is gradually depleted and interest in the environment is increasing, the demand for electric vehicles (EVs) such as plug-in electric vehicles (PEVs) and plug-in hybrid electric vehicles (PHEVs) is increasing worldwide.

Accordingly, more attention and research are focused on a battery pack, which is a key component of the electric vehicle, and it is urgent to develop a quick charging technology for quickly charging a battery. In particular, quick charging is also a very important measure of performance, especially for PEVs without an additional energy source.

The process of charging a battery includes supplying a current to the battery to accumulate charge and energy, and this process must be carefully controlled. In general, an excessive charging rate or charging voltage may permanently degrade the performance of the battery and ultimately cause a complete failure or an unexpected disorder such as leakage of corrosive chemicals or explosion.

"C", namely C-rate, is used as the unit of charging rate and discharging rate. For example, 1C means a charging and discharging speed of using or filling the capacity of a fully charged battery in 1 hour, and also means a current density at that time. Recently, as the functions of electronic devices are diversified, the demanded current used by the devices within a predetermined time is also greatly increased. Accordingly, the battery used as an energy source is also demanded to have much higher performance. Most existing mobile phones require ½ C, but in the future, performance corresponding to 1C may be demanded since the features will be further improved. At the present, a notebook battery, a battery pack for an electric vehicle or the like demands a similar charging C-rate and a much higher discharge C-rate.

In the vehicle market, the demand for charging time is increasing, so a higher charging C-rate is required to meet this requirement. Thus, it is preferable that the charging C-rate is 1C or above in view of quick charging. However, when the electric vehicle is charged, if the battery is unconditionally charged with a strong voltage and current, the internal structure of the battery may be destroyed, resulting in reduced durability and output. For this reason, more attention is required. For example, during quick charging with a high charging current density, Li is not intercalated but precipitated at a negative electrode, thereby causing a Li-plating phenomenon. In addition, if the battery is continuously charged at a high current, much heat may be generated inside the battery unlike in the normal charging process, and each electrode may come into an overvoltage state due to the resistance of the battery.

In general, charging of a battery pack for an electric vehicle is controlled by a battery management system (BMS) provided in the battery pack. The BMS needs to control quick charging for a short time by selecting an appropriate control variable. The control variable most related to the endurance life of the battery pack may be the battery temperature. Depending on the temperature of the battery, the charged current may be limited and the battery endurance life may be changed. For example, after charging starts, the BMS detects the battery SOC (state of charge) and temperature, and the charging is performed until the SOC reaches a target SOC. However, if the battery temperature is a threshold temperature or above, the BMS may temporarily stop charging to cool the battery and charge the battery to the target SOC only when the battery temperature is below the threshold temperature.

In the conventional method where charging may be stopped when the battery temperature rises higher than the set threshold temperature as above, if cooling is insufficient when the conventional cooling method is applied, the charging is inevitably delayed. Thus, quick charging also requires a cooling method differentiated from the normal charging process.

As a general method of cooling a battery, a water-cooling method and an air-cooling method are widely known. In order to cool a battery pack for an electric vehicle, an air-cooling structure using air is generally used, in which air in or out of the vehicle is inhaled to cool the battery pack and is then discharged. However, there is a limit in cooling the battery pack using only air. In particular, since the circulation of air is not smooth when the vehicle is stopped, there is a limit in cooling the battery pack effectively by dissipating heat generated from the battery pack to the outside.

The water-cooling method is a technology for cooling using a heat exchange medium such as a coolant. In the water-cooling method, a coolant conduit shaped like a coil of an electric pad is mounted to allow thermal conduction with the outside of the battery, and a coolant is introduced into the coolant conduit to indirectly cool the battery by means of thermal conduction. For example, Korean Patent Nos. 10-1112442, 10-120518, 10-1833526, and the like disclose a battery module having a water-cooling device.

The water-cooling method has excellent cooling efficiency compared to the air-cooling method. Thus, it would be desirable if a more specialized cooling method and system is implemented during quick charging of a battery pack for an electric vehicle by using the water-cooling method.

DISCLOSURE

Technical Problem

The present disclosure is directed to providing a battery pack cooling system for an electric vehicle, which may be utilized during quick charging.

The present disclosure is also directed to providing a method of cooling a battery pack system for an electric vehicle, which may be utilized during quick charging.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack cooling system for an electric vehicle, comprising: a battery pack including a plurality of batteries; a water-cooling device having a coolant conduit mounted to allow thermal conduction with an outside of the batteries and configured to indirectly cool the batteries by means of thermal conduction by introducing a coolant into the coolant conduit; a thermoelectric module installed between an inlet coolant conduit for introducing the coolant toward the battery pack and an outlet coolant conduit for discharging the coolant cooling the battery pack to the outside of the battery pack at the coolant conduit of the water-cooling device, the thermoelectric module having a heat absorbing surface facing the inlet coolant conduit and a heat emitting surface facing the outlet coolant conduit; a current sensor configured to detect a magnitude of a charging current supplied to the battery pack; and a control unit configured to determine a charging C-rate based on the magnitude of the charging current and operate the thermoelectric module when the charging C-rate is a preset threshold or above so that a temperature difference is caused between the heat absorbing surface and the heat emitting surface.

Preferably, the heat absorbing surface may be in contact with the inlet coolant conduit and the heat emitting surface may be in contact with the outlet coolant conduit so that heat exchange is performed between the inlet coolant conduit and the outlet coolant conduit through the thermoelectric module.

The battery pack may further include a pack case and a cooling member provided inside the pack case so that the coolant flows therein to cool the batteries, a continuous channel may be formed in the cooling member so that both ends of the channel are connected to a coolant inlet for introducing the coolant toward the battery pack and a coolant outlet for discharging the coolant cooling the battery pack to the outside of the battery pack, the inlet coolant conduit may be connected to the coolant inlet, and the outlet coolant conduit may be connected to the coolant outlet.

Preferably, the battery pack cooling system for an electric vehicle may further comprise a temperature sensor installed at the battery pack to detect a temperature of the battery pack, and the control unit may be configured to determine a time-based change rate of the temperature of the battery pack by using the temperature sensor and the control unit may be configured to operate the thermoelectric module when the time-based change rate is a preset value or above and the charging C-rate is the preset threshold or above.

The charging current may be supplied from an external charging device out of the battery pack, and the current sensor may be installed on a charging line that connects the battery pack and the external charging device.

A power for operating the thermoelectric module may be supplied from an external power supply device, the battery pack cooling system for an electric vehicle may further comprise a switch connected between the external power supply device and the thermoelectric module, and the control unit may be configured to operate the thermoelectric module by turning on the switch.

In another aspect of the present disclosure, there is also provided a method of cooling a battery pack system for an electric vehicle, which includes a battery pack including a plurality of batteries; and a water-cooling device configured to indirectly cool the batteries by introducing a coolant into a coolant conduit that is mounted to allow thermal conduction with an outside of the batteries. The method comprises (a) providing a thermoelectric module between an inlet coolant conduit for introducing the coolant toward the battery pack and an outlet coolant conduit for discharging the coolant cooling the battery pack to the outside of the battery pack, the thermoelectric module having a heat absorbing surface facing the inlet coolant conduit and a heat emitting surface facing the outlet coolant conduit; (b) determining a charging C-rate by measuring a magnitude of a charging current flowing through a charging line that connects the battery pack and an external charging device; and (c) operating the thermoelectric module when the charging C-rate is a preset threshold or above so that a temperature difference is caused between the heat absorbing surface and the heat emitting surface of the thermoelectric module to lower the temperature of the coolant at the heat absorbing surface and supply the low-temperature coolant toward the battery pack.

Preferably, the (a) step may include allowing the heat absorbing surface to contact the inlet coolant conduit and the heat emitting surface to contact the outlet coolant conduit so that heat exchange is performed between the inlet coolant conduit and the outlet coolant conduit through the thermoelectric module.

Preferably, in the (c) step, the thermoelectric module may be operated during quick charging where the charging C-rate is 2C or above.

Preferably, the (c) step may include measuring a temperature of the battery pack; and operating the thermoelectric module when a time-based change rate of the temperature of the battery pack is a preset value or above and the charging C-rate is the preset threshold or above.

In the (c) step, a power may be supplied from an external power supply device to operate the thermoelectric module.

Advantageous Effects

During quick charging, a cooling method differentiated from a normal charging process is required. According to the present disclosure, since the thermoelectric module is operated during quick charging to cool the coolant to be used for cooling the battery pack, it is possible to effectively remove a large amount of heat generated from the battery pack during quick charging.

Thus, the delayed charging caused in the conventional battery pack when the cooling is not sufficient may be solved, and also the thermal accumulation leading to degrading the battery pack may also be solved. Since the degradation of the battery pack is solved, it is also possible to prolong the life of the battery pack and prevent fire or explosion fundamentally.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. However, the embodiments according to the present disclosure may be modified in various ways, and the scope of the present disclosure should not be construed as being limited to the following embodiments. The embodiments of the present disclosure are provided to more fully describe the present disclosure to those skilled in the art.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustration only, not intended to limit the scope of the disclosure, so it should be understood that other equivalents and modifications could be made thereto without departing from the scope of the disclosure.

Figure 1:
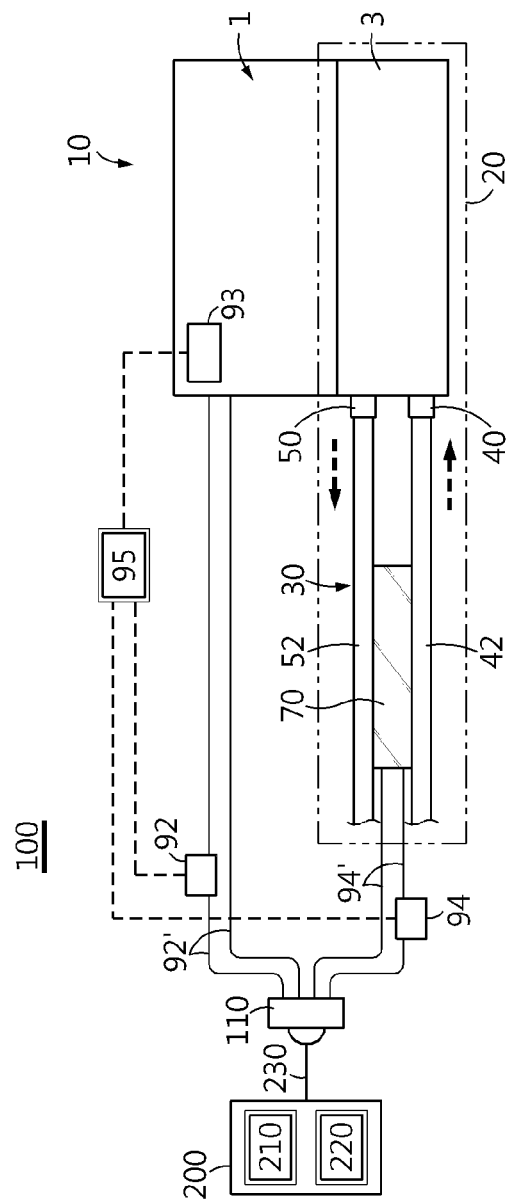
FIG. 1 is a schematic diagram showing a battery pack cooling system for an electric vehicle according to an embodiment of the present disclosure.

FIG. 1 is a diagram showing a battery pack cooling system for an electric vehicle according to an embodiment of the present disclosure.

Referring to FIG. 1, the battery pack cooling system 100 for an electric vehicle according to an embodiment of the present disclosure is a thermoelectric module (TEM) 70 applied to a battery pack system 10.

In FIG. 1, the reference sign "200" designates an electric vehicle charging station. For example, a battery pack 1 may be charged at an electric vehicle charging station 200 by connecting a cable 230 of the electric vehicle charging station 200 to a connector 110 of an electric vehicle. At this time, the electric vehicle charging station 200 may include an external charging device 210 and an external power supply device 220.

The battery pack system 10 includes a battery pack 1 and a water-cooling device 20.

The battery pack 1 includes a plurality of batteries 1'.

The water-cooling device 20 indirectly cools the batteries 1' by introducing a coolant through a coolant conduit 30 mounted to allow external thermal conduction with the outside of the batteries 1'. A dashed arrow in the figure means a flow direction of the coolant. The water-cooling device 20 may further include a heat exchanger (not shown) for exchanging heat with the coolant conduit 30.

The battery pack cooling system 100 for an electric vehicle may be used along with air-cooling that is performed in a common electric vehicle. For example, the battery pack cooling system 100 may jointly use an indoor air cooling method in which indoor air (indoor air supplied from an air conditioner) is sucked by a cooling fan at a predetermined indoor location such as a package tray, passed through the inside of the battery pack 1 and discharged through a trunk room.

Figure 2:
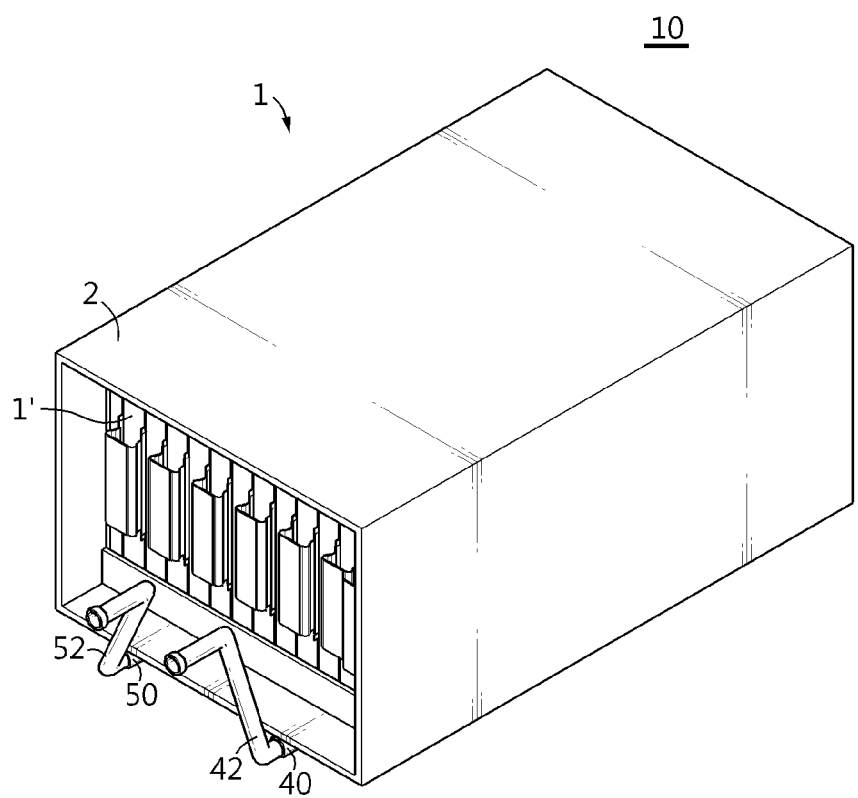
FIG. 2 is a perspective view showing a part of a battery pack system, which may be included in the battery pack cooling system for an electric vehicle in FIG. 1.
Figure 3:
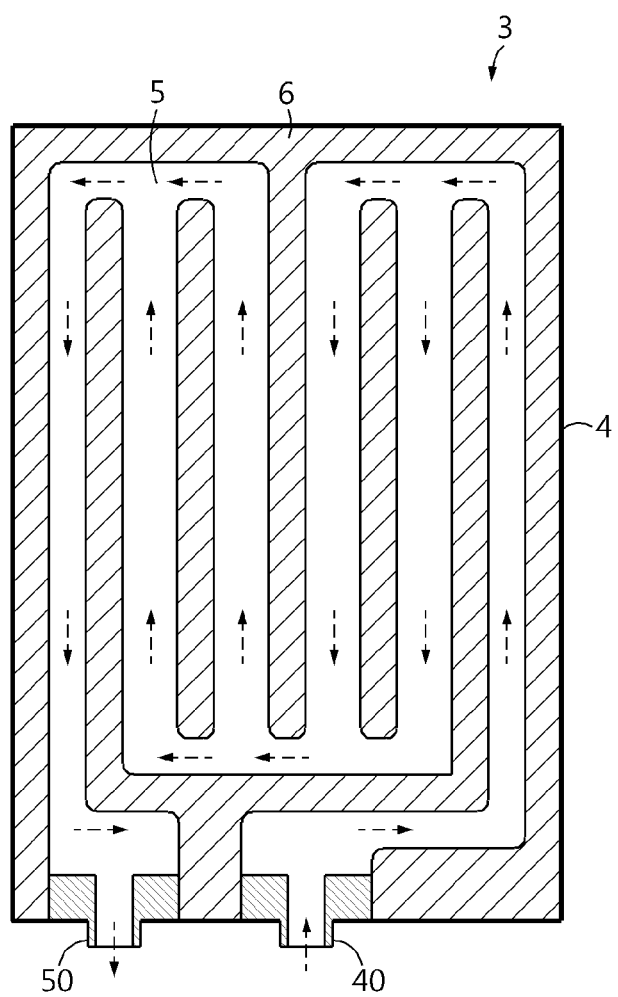
FIG. 3 is a schematic diagram exemplarily showing a cooling member, which may be included in the battery pack system of FIG. 2.
Figure 4:
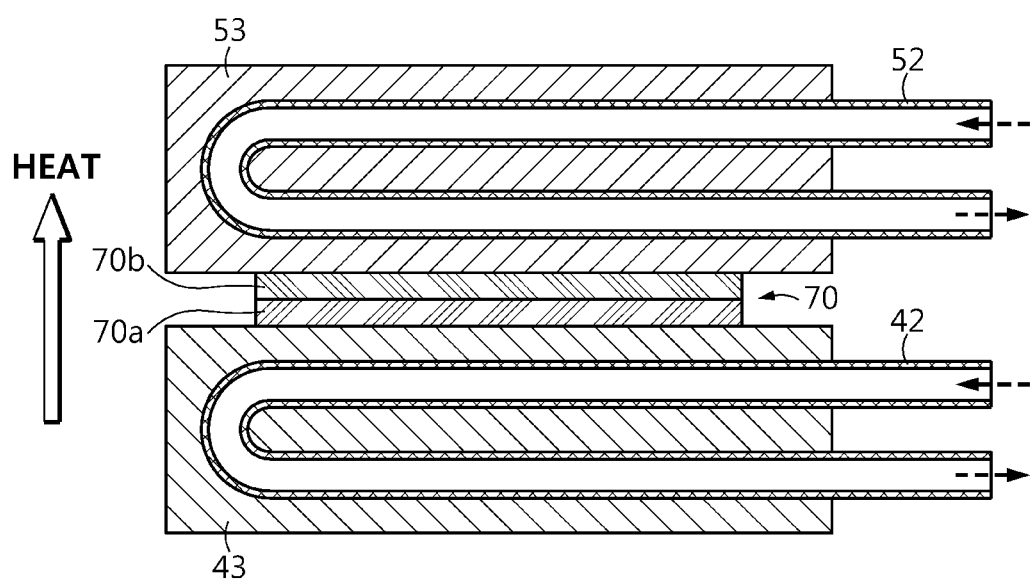
FIG. 4 schematically shows a connection relationship between a thermoelectric module and a coolant conduit, which may be included in the battery pack cooling system for an electric vehicle in FIG. 1.

FIG. 2 shows a part of a battery pack system, which may be included in the battery pack cooling system for an electric vehicle in FIG. 1. FIG. 3 is a diagram exemplarily showing a cooling member, which may be included in the battery pack system of FIG. 2. FIG. 4 schematically shows a connection relationship between a thermoelectric module and a coolant conduit, which may be included in the battery pack cooling system for an electric vehicle in FIG. 1.

In the above, first, referring to FIG. 2, the battery pack 1 of the battery pack system 10 includes a plurality of batteries 1' and a pack case 2. The pack case 2 has a structure capable of cooling the batteries 1' by flowing a coolant inside or outside the pack case 2 or through the pack case 2 itself.

For example, a cooling member 3 as shown in FIG. 3 may be provided in the pack case 2. The cooling member 3 is made of a metal plate 4 and may have a structure in which a continuous channel 5 is formed at an inner surface thereof and a remaining part 6 is sealed or solid. Both ends of the channel 5 are connected to a coolant inlet 40 for introducing a coolant toward the battery pack 1 and a coolant outlet 50 for discharging the coolant cooling the battery pack 1 to the outside of the battery pack 1. In the figure, a dashed arrow designates a flow direction of the coolant.

Referring to FIG. 1 again, the coolant conduit 30 is connected to the coolant inlet 40 and the coolant outlet 50 at the outside of the battery pack 1 with respect to the cooling member 3 of the battery pack system 10. The coolant conduit 30 includes an inlet coolant conduit 42 connected to the coolant inlet 40 and located near the coolant inlet 40, and an outlet coolant conduit 52 connected to the coolant outlet 50 and located near the coolant outlet 50. In the battery pack system 10 of FIG. 2, the inlet coolant conduit 42 and the outlet coolant conduit 52 are partially depicted.

If there is a temperature difference between both ends of a material in a solid state, a concentration difference is generated at carriers (electrons or holes) with thermal dependency, which is represented as an electrical phenomenon called thermoelectric force, namely thermoelectric phenomenon. As such, the thermoelectric phenomenon means a reversible and direct energy conversion between temperature difference and voltage. The thermoelectric phenomenon may be classified into thermoelectric power generation, which generates electrical energy, and thermoelectric cooling/heating, which causes a temperature difference between both ends by applying a current.

In the present disclosure, the thermoelectric module 70 is supplied with power from the external power supply device in order to perform thermoelectric cooling by causing a temperature difference at both ends of the thermoelectric module 70. If an electromotive force is formed on both surfaces of the thermoelectric module 70 by supplying a power from the external power supply device, one surface is cooled by heat absorption and the other surface is heated by heat emission. Thus, when a current is applied by applying a driving power, one surface of the thermoelectric module 70 becomes a heat absorbing surface and the other surface thereof becomes a heat emitting surface.

As shown in FIG. 1, the thermoelectric module 70 is particularly installed between the inlet coolant conduit 42 and the outlet coolant conduit 52 of the water-cooling device 20, as shown in FIG. 4 in more detail.

As shown in FIG. 4, the thermoelectric module 70 is attached between the inlet coolant conduit 42 or the surface of an inlet coolant conduit support member 43 surrounding the inlet coolant conduit 42 and the outlet coolant conduit 52 or the surface of an outlet coolant conduit support member 53 surrounding the outlet coolant conduit 52. The direction of the applied current by supplying the driving power is formed such that the inlet coolant conduit 42 or the surface of the inlet coolant conduit support member 43 surrounding the inlet coolant conduit 42 forms a heat absorbing surface 70a, and the outlet coolant conduit 52 or the surface of the outlet coolant conduit support member 53 surrounding the outlet coolant conduit 52 forms a heat emitting surface 70b. In this way, if a current is applied, the thermoelectric module 70 absorbs heat from the inlet coolant conduit 42 and emits heat toward the outlet coolant conduit 52, thereby forming a heat flow as indicated by the arrow in FIG. 4. In other words, the heat absorbing surface 70a is attached to the inlet coolant conduit 42 and the heat emitting surface 70b is attached to the outlet coolant conduit 52 so that heat is exchanged between the inlet coolant conduit 42 and the outlet coolant conduit 52 through the thermoelectric module 70. Here, the inlet coolant conduit support member 43 and the outlet coolant conduit support member 53 may surround the inlet coolant conduit 42 and the outlet coolant conduit 52, respectively, to structurally support the inlet coolant conduit 42 and the outlet coolant conduit 52 in a vehicle, and the inlet coolant conduit support member 43 and the outlet coolant conduit support member 53 may be excluded.

As described above, in the present disclosure, the heat absorbing surface 70a and the heat emitting surface 70b of the thermoelectric module 70 are provided to face the inlet coolant conduit 42 and the outlet coolant conduit 52, respectively. It is preferable that the heat absorbing surface 70a is in contact with the inlet coolant conduit 42 and the heat emitting surface 70b is in contact with the outlet coolant conduit 52 so that heat is exchanged between the inlet coolant conduit 42 and the outlet coolant conduit 52 through the thermoelectric module 70. The contact includes both direct contact and indirect contact through the support members 43, 53.

In general, a thermoelectric module may include a pair of p-n thermoelectric elements, which includes a p-type thermoelectric element in which holes move to transfer thermal energy and an n-type thermoelectric element in which electrons move to transfer thermal energy, as a basic unit. In addition, the thermoelectric module may include an electrode connecting the p-type thermoelectric element and the n-type thermoelectric element to each other. Also, the thermoelectric module may include a substrate disposed at an outer portion of the thermoelectric module to electrically insulate components such as the electrode from the outside and protect the thermoelectric module from external physical or chemical elements.

Figure 5:
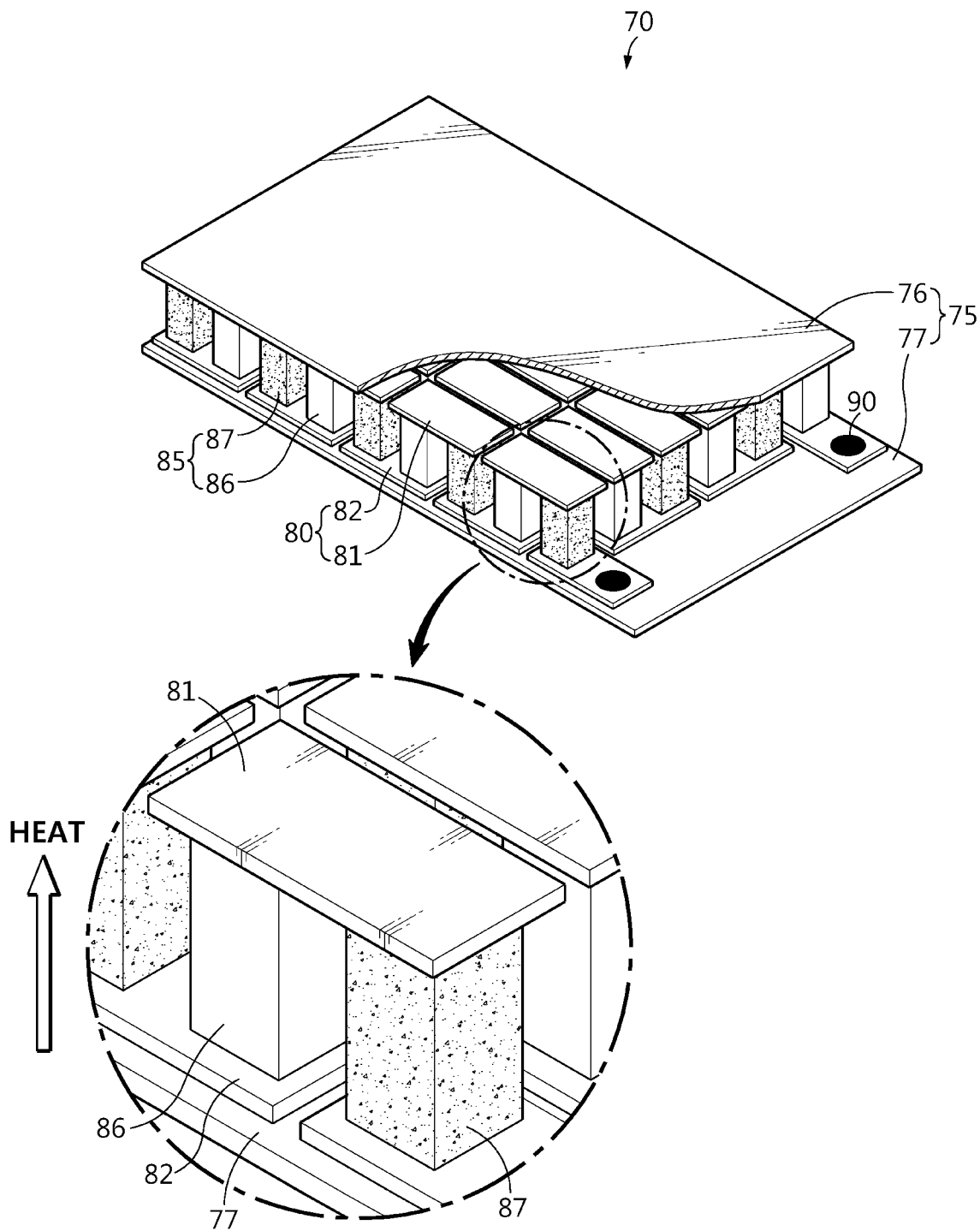
FIG. 5 is a perspective, partially cutaway view showing a thermoelectric module, which may be included in the battery pack cooling system for an electric vehicle in FIG. 1.

FIG. 5 is a perspective, partially cutaway view showing a thermoelectric module, which may be included in the battery pack cooling system for an electric vehicle in FIG. 1.

Referring to FIG. 5, the thermoelectric module 70 includes a substrate 75, an electrode 80 and a thermoelectric element 85.

The substrate 75 has a plate shape and is disposed on the outside of the thermoelectric module 70 to protect various components of the thermoelectric module 70, such as the thermoelectric element 85, and to maintain electrical insulation between the thermoelectric module 70 and the outside. The substrate 75 may be an alumina substrate. The substrate 75 includes a pair of upper substrate 76 and lower substrate 77 facing each other.

The electrode 80 has electric conductivity to allow a current to flow. In addition, the electrode 80 may be provided on the substrate 75. In particular, the electrode 80 may be configured to be exposed on at least one surface of the substrate 75 such that the thermoelectric element 85 is mounted thereto. In particular, at least two thermoelectric elements 85 may be mounted to the electrode 80, and a path for a current to flow is provided between the two thermoelectric elements 85. The electrode 80 may be provided on the lower surface of the upper substrate 76 and the upper surface of the lower substrate 77 by deposition, sputtering, direct compression, printing, or the like, and a plurality of thermoelectric elements 85 may be disposed therebetween to configure the thermoelectric module 70. The electrode 80 used may also be a direct bonded copper (DBC) type substrate, which is formed directly on the substrate 75. The electrode 80 is preferably made of a metal, for example at least one metal selected from the group consisting of Cu, Au, Ag, Ni, Al, Cr, Ru, Re, Pb, Sn, In and Zn, or an alloy containing at least two of these metals. Among the electrodes 80, the upper electrodes 81 formed at the upper substrate 76 are connected to each other at the upper portion of the thermoelectric element 85, and among the electrodes 80, the lower electrodes 82 formed at the lower substrate 77 are connected to each other at the lower portion of the thermoelectric element 85.

The thermoelectric element 85 may be made of a thermoelectric material, namely a thermoelectric semiconductor. The thermoelectric semiconductor may include various kinds of thermoelectric materials such as chalcogenides, skutterudites, silicides, clathrates, and half heuslers. For example, thermoelectric materials such as BiTe-based materials and PbTe-based materials may be appropriately doped. Various types of thermoelectric semiconductors known at the time of filing of this application may be used as the material of the thermoelectric element 85.

The thermoelectric element 85 may be configured in a form in which the thermoelectric material is sintered in a bulk form. In the conventional thermoelectric module, the thermoelectric element is frequently configured on the electrode mainly through a deposition method. However, in the thermoelectric module 70 described as an example, the thermoelectric element 85 is not deposited on the electrode 80 but may be firstly sintered in a bulk form. In addition, the thermoelectric element 85 of a bulk form may be bonded to the electrode 80. Although not shown in the drawings, a buffer layer (not shown) may be further included between the electrode 80 and the thermoelectric element 85 to improve adhesion.

First, the thermoelectric element 85 may be manufactured in a bulk form. At this time, the thermoelectric element 85 in a bulk form may be manufactured using a method including the steps of mixing raw materials of the thermoelectric element 85 to form a mixture, thermally treating the mixed raw materials to form a composite, and sintering the composite. The thermoelectric material sintered in the sintering step may be in a bulk form. Next, the thermoelectric material sintered in a bulk form may be processed into a size and/or shape suitable for application to the thermoelectric module 70. For example, the thermoelectric material sintered in a cylindrical bulk form may be cut into a smaller hexahedral bulk form. That is, the thermoelectric material may have a structure formed by pulverizing an ingot, which is the thermoelectric material, then performing a miniaturizing ball-milling process thereto, and then cutting the sintered structure. In addition, the thermoelectric material processed into a smaller bulk form may be bonded to the electrode 80 of the substrate 75 as the thermoelectric element 85. Here, the thermoelectric element 85 in a bulk form and the electrode 80 may be bonded in various ways such as thermal treatment such as sintering or soldering, and the present disclosure is not limited to a specific bonding method.

As described above, according to the configuration in which the thermoelectric element 85 is sintered in a bulk form and then bonded to the electrode 80, since the thermoelectric element 85 has a compact structure through sintering, the thermoelectric performance may be significantly improved compared to a conventional thermoelectric element, in particular a conventional thermoelectric element configured in a vapor deposition form.

The thermoelectric element 85 may be referred to as a thermoelectric leg or the like and may include an n-type thermoelectric element 86 and a p-type thermoelectric element 87. Here, the n-type thermoelectric element 86 may be configured by sintering an n-type thermoelectric material in a bulk form. In addition, the p-type thermoelectric element 87 may be configured by sintering a p-type thermoelectric material in a bulk form. As the n-type thermoelectric material and the p-type thermoelectric material, various materials known at the time of filing of this application may be employed, and thus this is not described in detail here.

In the thermoelectric element 85, the n-type thermoelectric element 86 and the p-type thermoelectric element 87 may be paired to constitute one basic unit. In addition, the n-type thermoelectric element 86 and the p-type thermoelectric element 87 may be provided in numbers of two or more, thereby forming a plurality of pairs. In addition, the n-type thermoelectric element 86 and the p-type thermoelectric element 87 may be alternately arranged into multiple pairs of n-type thermoelectric elements 86 and p-type thermoelectric elements 87.

The n-type thermoelectric element 86 and the p-type thermoelectric element 87 may be electrically connected to each other via the electrode 80. For example, based on one electrode 80, the n-type thermoelectric element 86 may be bonded to one end of the electrode 80 and the p-type thermoelectric element 87 may be bonded to the other end of the electrode 80. The shape of the upper electrode 81 and the lower electrode 82 respectively formed at the upper substrate 76 and the lower substrate 77 should be put into consideration so that they may be thermally connected in parallel and electrically connected in series. The thermoelectric elements 85 are connected in series, and lead wires 90 are provided at both ends of the thermoelectric elements 85 connected in series so that electricity is supplied thereto from the outside.

The amount and direction of heat absorption and heat emission may be adjusted by the magnitude and direction of the current applied to the thermoelectric module 70. The electrode 80 in contact with the n-type thermoelectric element 86 generates heat on a side where the current flows in and absorbs heat at the opposite side, and the p-type thermoelectric element 87 generates and absorbs heat in the reverse manner. The thermoelectric module 70 has no mechanically actuated parts, and its installation position or direction do not affect the operation. Thus, the thermoelectric module 70 is very suitable to be introduced into a water-cooling device 20 (FIG. 1). Moreover, since the thermoelectric module 70 may be manufactured to have a thin form, the thermoelectric module 70 may be inserted into the space between the coolant conduits 30 (FIG. 1) and may provide high cooling performance without increasing the size or weight of the water-cooling device.

Referring to FIGS. 4 and 5 together, in an embodiment of the present disclosure, the heat absorbing surface 70a of the thermoelectric module 70 is attached to the inlet coolant conduit 42 or the support member 43 surrounding the inlet coolant conduit 42, and simultaneously the heat emitting surface 70b of the thermoelectric module 70 is attached to the outlet coolant conduit 52 or the surface of the support member 53 surrounding the outlet coolant conduit 52. For example, the lower substrate 77 becomes the heat absorbing surface 70a, and the upper substrate 76 becomes be the heat emitting surface 70b. The direction of the current applied to the lead wire 90 is determined as above. In FIG. 5, the heat flow corresponding thereto is also indicated by an arrow.

The use of the battery pack cooling system 100 as described above corresponds to the cooling method for the battery pack system 10. Referring to FIG. 1 again, the components of the battery pack cooling system 100 and the use of the battery pack cooling system 100 will be described in more detail.

The battery pack cooling system 100 further includes a current sensor 92, a temperature sensor 93, a switch 94, and a control unit 95.

The current sensor 92 detects the magnitude of a charging current supplied to the battery pack 1. The charging current is supplied from the external charging device 210 out of the battery pack 1, and, for example, the external charging device 210 may be included in the charging station 200 of the electric vehicle. The current sensor 92 may be installed to a charging line 92' that connects the battery pack 1 and the external charging device 210.

The temperature sensor 93 is installed in the battery pack 1 to detect a temperature of the battery pack 1. The temperature sensor 93 is for example a thermocouple.

The power for operating the thermoelectric module 70 is supplied from the external power supply device 220, and, for example, the external power supply device 220 may be included in the charging station 200 of the electric vehicle. The switch 94 is connected between the external power supply device 220 and the thermoelectric module 70 to control the connection between the external power supply device 220 and the thermoelectric module 70. For example, the switch 94 may be installed to a power supply line 94' that connects the external power supply device 220 to the thermoelectric module 70.

The control unit 95 is connected to the current sensor 92, the temperature sensor 93 and the switch 94, obtains information from the current sensor 92 and the temperature sensor 93, performs various calculations for controlling the operation of the switch 94, and outputs a control signal to control the current sensor 92, the temperature sensor 93 and the switch 94. The control unit 95 may be a battery management system (BMS).

In particular, the control unit 95 determines a charging C-rate based on the magnitude of the charging current. If the determined charging C-rate is a preset threshold or above, the thermoelectric module 70 is operated to induce a temperature difference between the heat absorbing surface 70a and the heat emitting surface 70b. In this embodiment, if the control unit 95 turns on the switch 94, the thermoelectric module 70 may be operated. In addition, the control unit 95 may determine a time-based change rate of the temperature of the battery pack 1 using the temperature sensor 93. The thermoelectric module 70 may be configured to be operated if the time-based change rate is a preset value or above and the charging C-rate is the preset threshold or above.

The method of cooling the battery pack system 10 using the battery pack cooling system 100 may be performed as follows.

The thermoelectric module 70 is provided between the inlet coolant conduit 42 for introducing a coolant toward the battery pack 1 and the outlet coolant conduit 52 for discharging the coolant cooling the battery pack 1 to the outside of the battery pack 1 at the coolant conduit 30 of the water-cooling device 20. Here, the heat absorbing surface 70a and the heat emitting surface 70b of the thermoelectric module 70 are provided to face the inlet coolant conduit 42 and the outlet coolant conduit 52, respectively.

The control unit 95 determines the charging C-rate by measuring the magnitude of the charging current flowing through the charging line 92' that connects the battery pack 1 and the external charging device 210 by using the current sensor 92. If the charging C-rate is the preset threshold or above, the control unit 95 operates the thermoelectric module 70 to cause a temperature difference between the heat absorbing surface 70a and the heat emitting surface 70b of the thermoelectric module 70, and lowers the temperature of the coolant at the heat absorbing surface 70a to be supplied toward the battery pack 1.

Meanwhile, in an embodiment, the control unit 95 may measure the temperature of the battery pack 1 using the temperature sensor 93 and then operate the thermoelectric module 70 if the time-based change rate of the temperature of the battery pack 1 is the preset value or above and the charging C-rate is the preset threshold value or above. Compared to the case where the control unit 95 determines simply the charging C-rate, if the control unit 95 determines whether or not to operate the thermoelectric module 70 by considering the time-based change rate of the temperature of battery pack 1, even though the charging C-rate may be below the preset threshold, if the temperature of the battery pack 1 rises rapidly due to insufficient cooling, the thermoelectric module 70 may be operated, thereby preventing the temperature of the battery pack 1 from rising.

When the thermoelectric module 70 is in operation, the heat absorbing surface 70a of the thermoelectric module 70 absorbs heat from the inlet coolant conduit 42, thereby lowering the temperature of the inlet coolant passing through the inlet coolant conduit 42. In this way, in the present disclosure, since the thermoelectric module 70 is applied to lower the temperature of the coolant such as a cooling water and supply the low-temperature coolant to the battery pack 1, the cooling performance is improved. This is the first feature of the present disclosure.

When the thermoelectric module 70 is in operation, the heat emitting surface 70b of the thermoelectric module 70 emits heat toward the outlet coolant conduit 52 or the surface of the support member surrounding the outlet coolant conduit 52 while the heat absorbing surface 70a is lowering the temperature of the inlet coolant. The coolant passing through the outlet coolant conduit 52 moves with the heat generated by the heat emitting surface 70b of the thermoelectric module 70. As described above, the heat is removed using the outlet coolant so that the temperature of the heat emitting surface does not rise, instead of naturally dissipating or accumulating heat at the heat emitting surface of the thermoelectric module 70. This is the second feature of the present disclosure.

The thermoelectric module 70 is operated only during quick charging, such as in a case where the charging C-rate is at the preset threshold or above. This is the third feature of the subject invention. The thermoelectric module 70 requires power consumption to make a temperature difference. Thus, the thermoelectric module 70 is not operated during normal charging processes but rather is operated only during quick charging.

In addition, the power required to operate the thermoelectric module 70 is solved using a separate external power source when the battery pack 1 is charged. This is the fourth feature of the present disclosure. The power for operating the thermoelectric module 70 is supplied from the external power supply device 220, and, for example, the external power supply device 220 may be included in the charging station 200 of the electric vehicle.

The time taken to quickly charge a battery in an electric vehicle, which is being developed by vehicle manufacturers, from 5% SOC to 80% SOC is about 30 minutes. This means that the charging C-rate is less than about 2C. In a vehicle using a general engine such as a gasoline engine or a diesel engine, the fueling time is generally about 5 minutes. Compared to this, the electric vehicle takes a considerable time even if quick charging is performed. Fueling and charging are the same in terms of recharging the driving energy of the vehicle, and the fueling time and the charging time of the vehicle in long distance driving are important factors that should be considered in terms of the marketability of the vehicle.

A higher charging C-rate is preferred to reduce the charging time, but the charging C-rate should be decided in consideration of battery type and characteristics. For example, a battery for a PEV may set the charging C-rate to be about 1.5C. As another example, a battery for a PHEV may set the initial charging C-rate to be 3C. Depending on the battery specifications that require a faster charging and discharging rate, the initial charging C-rate may be further increased, for example up to 5C. The charging C-rate may be limited not only by the type of a battery but also by the maximum current of a motor actually used in the vehicle. In the present disclosure, quick charging indicates that the charging C-rate is 1C or above, preferably 2C or above.

According to the present disclosure, the thermoelectric module 70 is operated by an external power only during quick charging, and the operated thermoelectric module 70 allows the inlet coolant to be cooled to a lower temperature before entering the battery pack 1, thereby increasing the battery cooling efficiency during quick charging. The outlet coolant cools the heat emitting surface 70b of the thermoelectric module 70 so that heat does not accumulate at the heat emitting surface 70b of the thermoelectric module 70 and the heat emitting surface 70b is kept at a low temperature.

As described above, in the present disclosure, the thermoelectric module 70 is configured to suitably exchange heat between the inlet coolant conduit 42 and the outlet coolant conduit 52, and thus the temperature of the coolant that cools the battery pack 1 is lowered and then the cooled coolant is supplied to the battery pack 1, thereby increasing the cooling performance. The thermoelectric module 70 is designed to operate with an external power, which may be supplied from the charging station of the electric vehicle during quick charging, thereby solving the problem of a power source required to operate the thermoelectric module 70.

In the present disclosure, since the thermoelectric module 70 is operated by supplying an external power to the thermoelectric module 70 during quick charging, even though the temperature of the battery pack 1 rises during quick charging, the battery pack 1 may be effectively cooled by supplying the coolant whose temperature is lowered. That is, the external power, which may be supplied from the charging station of the electric vehicle, is supplied to the thermoelectric elements 85 of the thermoelectric module 70 through the lead wire 90 to form the heat absorbing surface 70a and the heat emitting surface 70b. In particular, the thermoelectric module 70 is operated only during quick charging to cope with cooling during quick charging. Thus, the heat generated during quick charging of the battery pack for an electric vehicle may be effectively emitted to the outside, thereby suppressing the degradation of the battery pack.

Meanwhile, if a rise amount of the temperature of the battery pack according to the charging C-rate is known, it is possible to know the temperature of the coolant to be supplied when a suitable temperature of the battery pack to be maintained is determined. Thus, it is possible to determine the conditions such as the type of the thermoelectric element, the magnitude of current to be supplied for an appropriate temperature difference between the heat absorbing surface and the heat emitting surface, and the like, which are required for the above purpose. In addition, the actual shapes of the thermoelectric element and the cooling conduit may be changed as desired within the common ability of those skilled in the art.

Figure 6:
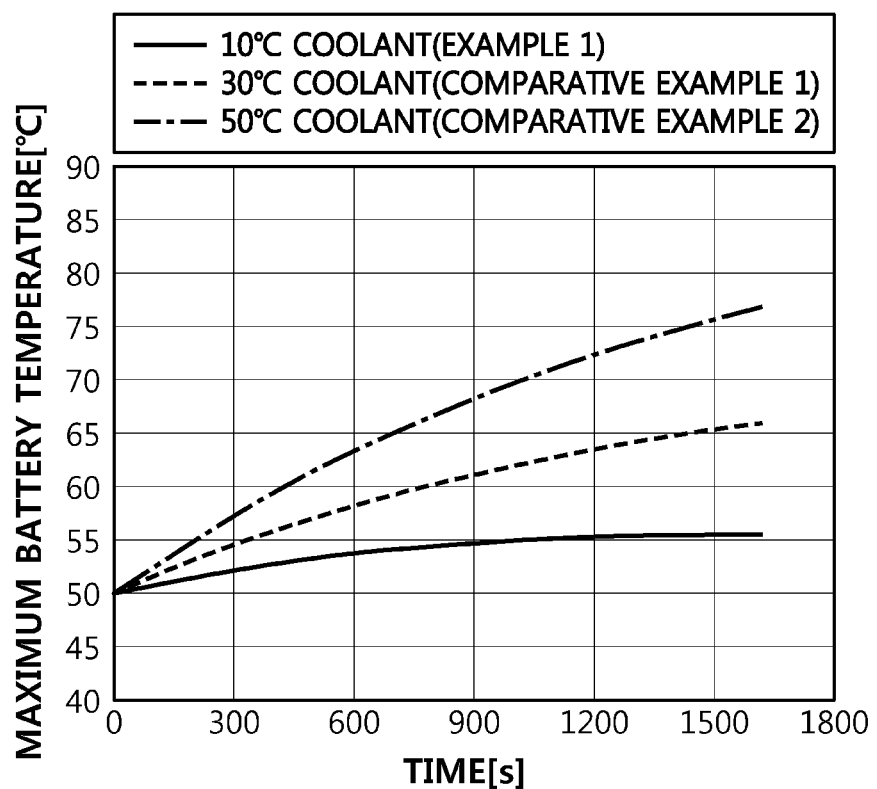
FIG. 6 is a graph that simulates a cooling effect of a method of cooling a battery pack cooling system for an electric vehicle according to an embodiment of the present disclosure.

FIG. 6 is a graph that simulates a cooling effect of a method of cooling a battery pack cooling system for an electric vehicle according to an embodiment of the present disclosure. In the graph, the horizontal axis represents time (s), and the vertical axis represents the maximum battery temperature (° C.).

FIG. 6 is obtained by assuming quick charging from 5% SOC to 95% of SOC with 2C. Among the three-dimensional, two-dimensional, one-dimensional and zero-dimensional simulation methods, the zero-dimensional simulation method "lumped model calculation" is used. Since the temperature changes with a charging time, the time-dependent "transient analysis" is used, instead of the time-independent "steady analysis".

It is assumed that an initial battery temperature is 50° C. and an ambient temperature is also 50° C. The conditions of the initial battery temperature and the ambient temperature may be changed as desired according to use environments. A maximum allowable battery temperature (for example, a threshold temperature that allows charging in BMS) is 60° C. The maximum allowable battery temperature condition depends on the type of battery. In this experimental example, the maximum allowable battery temperature is 60° C., which is commonly demanded in a battery having a three-component NCM (nickel, cobalt, manganese) positive electrode material. A total thermal resistance from the battery to the coolant is advantageously small. In this experimental example, the total thermal resistance is assumed to be 2.0 K/W, which is a value generally preferred in the battery specification for an electric vehicle.

According to the present disclosure, the temperature of the inlet coolant may be lowered to the ambient temperature or below, for example to 10° C. by operating the thermoelectric module (Example 1 of the present disclosure). This case is compared with a case where the temperature of the inlet coolant is 30° C. (Comparative Example 1) and a case where the temperature of the inlet coolant is 50° C. (Comparative Example 2), which is equal to the ambient temperature of this simulation experiment.

As shown in FIG. 6, the battery temperature increases as the (charging) time passes. The maximum battery temperature is changed to 55.2° C., 65.7° C. and 76.8° C., respectively, after about 1600 seconds as the temperature of the inlet coolant is changed to 10° C., 30° C. and 50° C.

Thus, as in Example 1 of the present disclosure, the maximum battery temperature may be maintained to be 60° C. or below during charging if the temperature of the inlet coolant may be lowered to 10° C. In Comparative Examples 1 and 2, the maximum battery temperature exceeds 60° C.

After charging is initiated, the BMS detects SOC and temperature of the battery and charges the battery until the SOC reaches a target SOC. Here, if the battery is configured such that the charging is temporarily stopped to cool down the battery when the battery temperature is higher than the threshold temperature and the battery is charged to the target SOC only when the battery temperature is lower than the threshold temperature, the battery may be completely charged within a short time without temporarily stopping the charging as long as the maximum battery temperature is kept below 60° C. as in the present disclosure. However, in Comparative Examples 1 and 2 where it is impossible to lower the coolant temperature and supply a cooled coolant, different from the present disclosure, the maximum battery temperature exceeds 60° C. as in the simulation, and thus it is required to temporarily stop the charging, thereby elongating the charging time.

As described above, the present disclosure relates to a cooling system for cooling a battery pack including a plurality of batteries and a cooling method using the cooling system. The cooling system includes a coolant conduit for allowing a coolant to flow therein and a thermoelectric module provided to an outer portion of the coolant conduit. Also, the heat absorbing surface of the thermoelectric module may be attached to the inlet coolant conduit, and the heat emitting surface may be attached to the outlet coolant conduit. For an electric vehicle to which the battery pack is mounted, the thermoelectric module is operated with an external power supplied when the electric vehicle is charged at a charging station. Since the coolant cooled by the thermoelectric module cools battery pack, the cooling performance may be improved against excessive heating of the battery pack during quick charging.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack cooling system for an electric vehicle, comprising:
   a battery pack including a plurality of batteries;
   a water-cooling device having a coolant conduit mounted to allow thermal conduction with an exterior of the plurality of batteries and configured to indirectly cool the plurality of batteries by means of thermal conduction via a coolant introduced into the coolant conduit, the coolant conduit including an inlet coolant conduit for introducing the coolant towards the battery pack and an outlet coolant conduit for discharging the coolant outside the battery pack;
a thermoelectric module installed between the inlet coolant conduit and the outlet coolant conduit, the thermoelectric module having a heat absorbing surface facing the inlet coolant conduit and a heat emitting surface facing the outlet coolant conduit;
a current sensor configured to detect a magnitude of a charging current supplied to the battery pack; and
a control unit configured to determine a charging C-rate based on the magnitude of the charging current and configured to activate operation of the thermoelectric module in response to the charging C-rate reaching a preset threshold or above, the operation of the thermoelectric module inducing a temperature difference between the heat absorbing surface and the heat emitting surface.

2. The battery pack cooling system for an electric vehicle according to claim 1,
wherein the heat absorbing surface is in contact with the inlet coolant conduit and the heat emitting surface is in contact with the outlet coolant conduit, so that heat exchange is performed between the inlet coolant conduit and the outlet coolant conduit through the thermoelectric module.

3. The battery pack cooling system for an electric vehicle according to claim 1,
wherein the battery pack further includes a pack case and a cooling member provided inside the pack case so that the coolant flows in the cooling member to cool the plurality of batteries,
wherein a continuous channel is formed in the cooling member so that a first end of the channel is connected to a coolant inlet for introducing the coolant toward the battery pack and a second end of the channel is connected to a coolant outlet for discharging the coolant outside the battery pack, and
wherein the inlet coolant conduit is connected to the coolant inlet, and the outlet coolant conduit is connected to the coolant outlet.

4. The battery pack cooling system for an electric vehicle according to claim 1, further comprising:
a temperature sensor installed at the battery pack to detect a temperature of the battery pack,
wherein the control unit is configured to determine a time-based change rate of the temperature of the battery pack by using the temperature sensor, and the control unit is configured to operate the thermoelectric module when the time-based change rate is at a preset value or above and the charging C-rate is at the preset threshold or above.

5. The battery pack cooling system for an electric vehicle according to claim 1,
wherein the current sensor is installed on a charging line that connects the battery pack to a connection for connecting to an external charging device outside the battery pack for supplying the charging current.

6. The battery pack cooling system for an electric vehicle according to claim 1, further comprising a switch connected between the thermoelectric module and a connection for connecting to an external power supply device,
wherein the thermoelectric module is configured to be operated by power supplied from the external power supply device, and
wherein the control unit is configured to operate the thermoelectric module by turning on the switch.

7. A method of cooling a battery pack system for an electric vehicle, the battery pack system including:
a battery pack including a plurality of batteries;
a water-cooling device configured to indirectly cool the plurality of batteries by introducing a coolant into a coolant conduit that is mounted to allow thermal conduction with an exterior of the plurality of batteries, the coolant conduit including an inlet coolant conduit for introducing the coolant towards the battery pack and an outlet coolant conduit for discharging the coolant outside the battery pack; and
a thermoelectric module positioned between the inlet coolant conduit and the outlet coolant conduit, the thermoelectric module having a heat absorbing surface facing the inlet coolant conduit and a heat emitting surface facing the outlet coolant conduit;
the method comprising:
(a) determining a charging C-rate by measuring a magnitude of a charging current flowing through a charging line that connects the battery pack and an external charging device; and
(b) activating operation of the thermoelectric module in response to the charging C-rate reaching a preset threshold or above, the operation of the thermoelectric module inducing a temperature difference between the heat absorbing surface and the heat emitting surface of the thermoelectric module to lower the temperature of the coolant at the heat absorbing surface and thereby supply the lowered-temperature coolant towards the battery pack.

8. The method of cooling a battery pack system for an electric vehicle according to claim 7, wherein the heat absorbing surface contacts the inlet coolant conduit and the heat emitting surface contacts the outlet coolant conduit so that heat exchange is performed between the inlet coolant conduit and the outlet coolant conduit through the thermoelectric module.

9. The method of cooling a battery pack system for an electric vehicle according to claim 7,
wherein step (b) comprises operating the thermoelectric module during quick charging where the charging C-rate is 2C or above.

10. The method of cooling a battery pack system for an electric vehicle according to claim 7,
wherein step (b) includes:
measuring a temperature of the battery pack; and
operating the thermoelectric module when a time-based change rate of the temperature of the battery pack is at a preset value or above and the charging C-rate is at the preset threshold or above.

11. The method of cooling a battery pack system for an electric vehicle according to claim 7,
wherein step (b) comprises operating the thermoelectric module using power supplied from an external power supply device.

* * * * *